Figure 1:
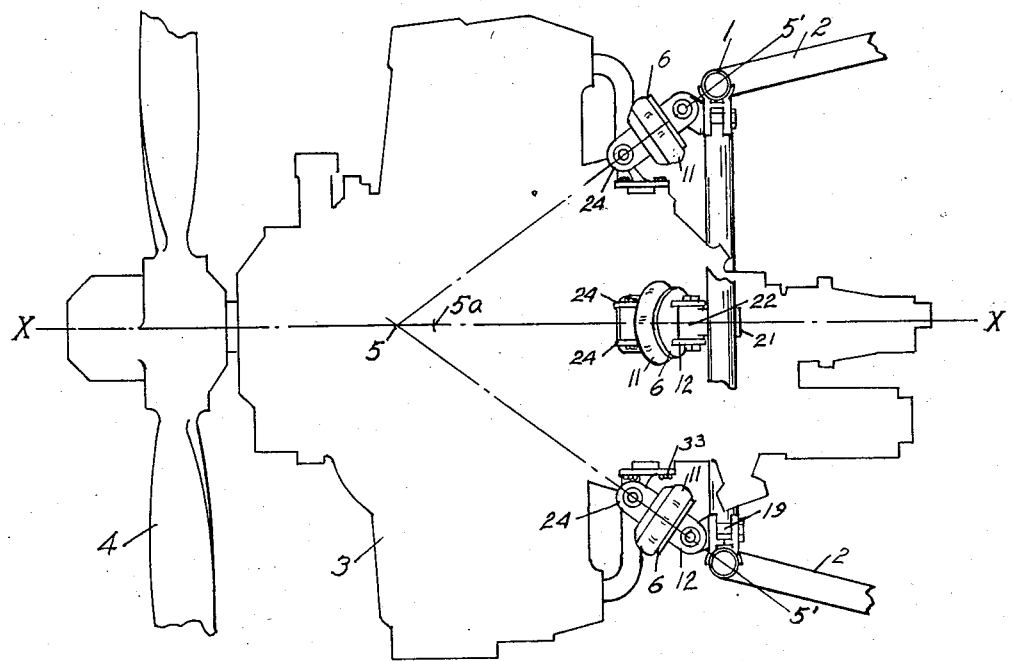

June 23, 1942.  H. C. LORD  2,287,316

RESILIENT MOUNTING

Filed Feb. 11, 1941  2 Sheets-Sheet 1

Hugh C. Lord
INVENTOR

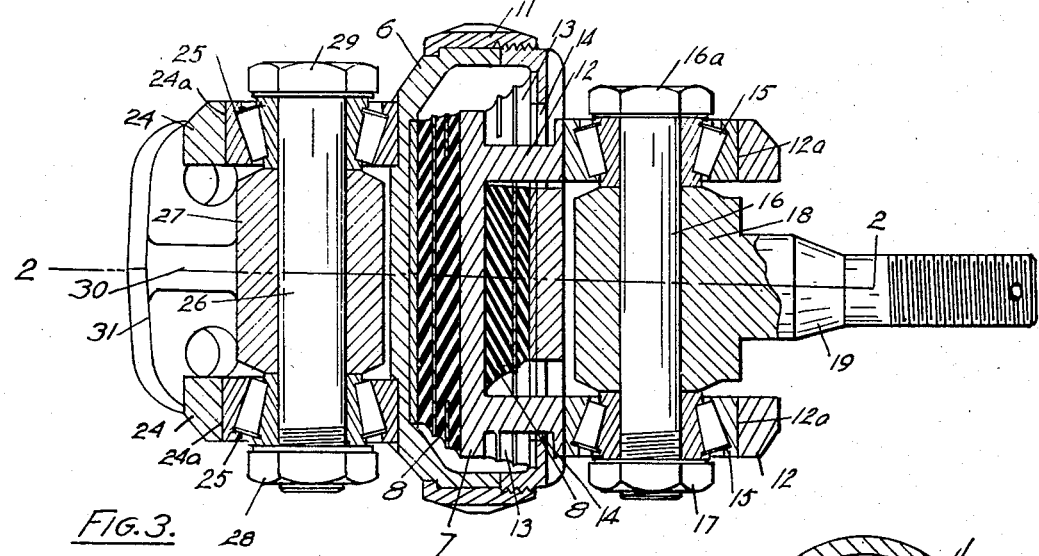
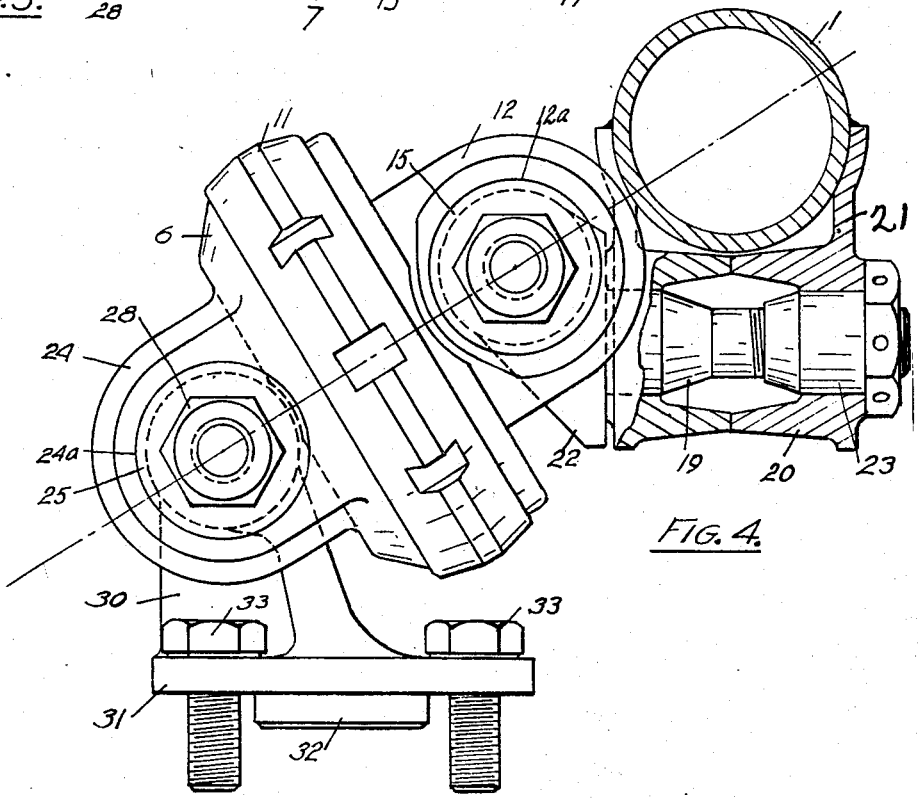

Patented June 23, 1942

2,287,316

UNITED STATES PATENT OFFICE 2,287,316

RESILIENT MOUNTING

Hugh C. Lord, Erie, Pa., assignor to Lord Manufacturing Company, Erie, Pa., a corporation of Pennsylvania Application February 11, 1941, Serial No. 378,377

7 Claims. (Cl. 248—5)

The present invention is designed to improve mountings for carrying vibrating bodies. It is particularly advantageous with relation to vibrating bodies subjected to torque impulses and is exemplified herein as supporting an overhung radial airplane engine.

Such engines have been secured by means of sandwich type mountings arranged tangentially to a sphere centered at the focal point of vibration adjacent to, if not at, the center of gravity of the mass of the engine and its attached parts. Such a structure is illustrated in the patent to Taylor, No. 2,175,999.

With this structure the resistance of the mounting to torque and pitch and yaw impulses has some variation, depending on the distance of the mountings from the axis of the engine and the focal point.

One difficulty with these mountings is that in most installations it is desirable to have a greater differentiation between the torque resistance and the pitch and yaw resistance. The present invention is intended to provide this relation. This is accomplished by providing each mounting with auxiliary joints having axes substantially at right angles to the focal line extending from the mounting to the focal point of the mounting assembly. Provided with such auxiliary joints, the torque resistance is maintained with the same force as with a rigidly connected mounting, but the resistance to pitch and yaw is reduced for the reason that mountings having the axes of the auxiliary joints at right angles to the direction of the pitch or yaw movement have a zero resistance to such movement. Other mountings of the assembly, those, for instance, having their axes in line with the pitch or yaw direction of movement, render full shear resistance to the movement. The result is that the pitch and yaw resistance is reduced to practically half of what it is without the auxiliary joints.

The substantially flat sandwich mountings permit of a very short coupled structure and this is a very decided advantage in many engine installations by reason of the clearances that are available on such engines. It will be noted that the swinging center of these mountings, except for the auxiliary mounting, is at the focal point and that the sandwich plates are tangent to a sphere at that point and that this radius is long enough so that with the short movement involved, the flat faced plates of the sandwich mounting may be used without changing the shear relation of the rubber to a substantial extent.

Features and details of the invention will appear from the specification and claims.

Figure 2:
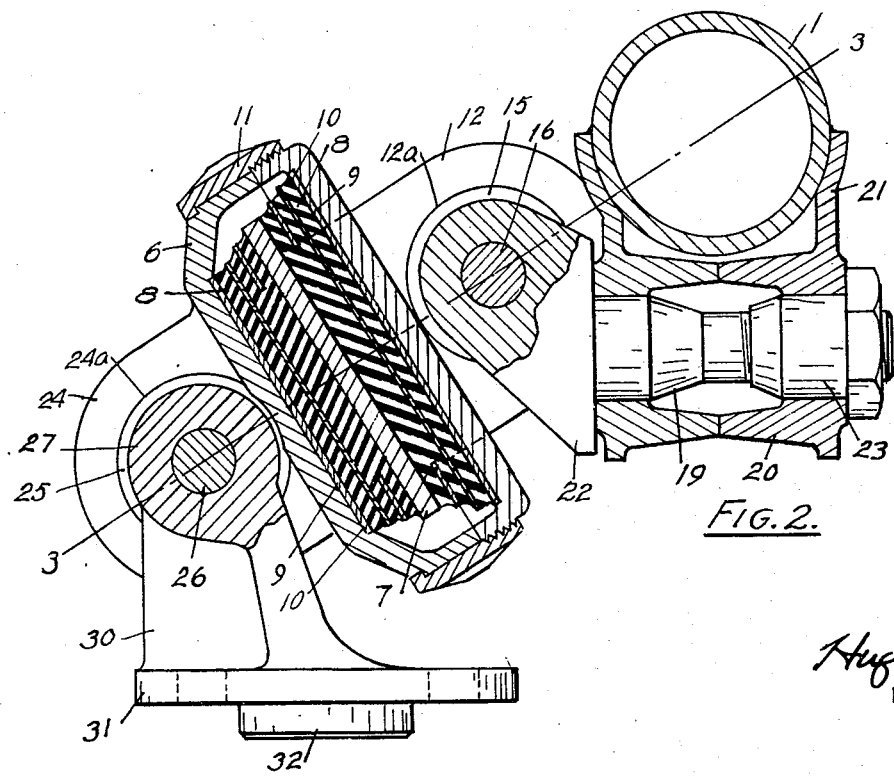

A preferred embodiment of the invention is illustrated in the accompanying drawings as follows:

Fig. 1 shows an outline of an engine of the radial type with the mountings in place thereon.
Fig. 2 a section on the line 2—2 in Fig. 3.
Fig. 3 a section on the line 3—3 in Fig. 2.
Fig. 4 a side elevation of the mounting.

1 marks a mounting ring for supporting an engine, and 2 struts supporting the ring, these being of usual construction. An engine 3, as shown of the radial type, is mounted in overhung relation in front of the ring. A propeller 4 is carried at the front of the engine and driven from the engine, either directly or indirectly, the type of driving connection not being shown.

The engine is supported by resilient mountings forming a connection between the mounting ring and the engine, the mountings being arranged at the supporting ring and directed to the focal point 5 in the axis $x$—$x$ preferably slightly in front of the center of gravity $5a$.

The mounting has a housing 6. The housing encloses a core 7. Resilient elements 8, preferably of rubber, are secured to the core preferably by bonding. One of these elements extends from each face of the core. Discs 9 are arranged at intervals in the elements 8 for increasing the resistance in the line of the load in these elements. The outer discs 9 seat in sockets 10 in the inner faces in the end walls of the housing. The housing 6 is made in two halves which may be secured together in any convenient manner, as shown, by a screw-threaded ring 11.

The core is connected to the engine through a pivotal joint. To accomplish this the core has arms 12 which extend toward the ring and through the housing, the element being provided with openings 13 and the housing with openings 14 through which the arms extend. A roller bearing joint 15 is mounted in the arms 12 being carried by a bolt 16 extending through the bearings, the bolt being provided with a head 16a and a nut 17. The bolt extends through a head 18 having a shank 19. The shank extends through arms 20 extending from a bracket 21. The shank provides a head 22 which engages one of the arms and a nut 23 secures the shank in the arms.

Arms 24 extend from the housing toward the engine. These arms have openings 24a receiving roller bearings 25. A bolt 26 extends through the roller bearings. The bolt is provided with a head 29 and a nut 28 by means of which the bearing is clamped against the ends of the head. The head is carried by a pedestal 30 which projects from a plate 31. The plate 31 has a projection 32 which extends into sockets in the engine. The plate is secured to the engine by cap screws 33.

The general scheme of the resilient member follows the teaching found in the Taylor Patent No. 2,175,999, the walls of the housing with the core forming what is commonly termed "sandwich" mountings, the plane of the metal parts engaged by the rubber being approximately tangent to a sphere having its center at the focal point 5. With this structure the torque impulses are resisted by the rubber in shear about the axis $x$—$x$ which usually extends approximately through the center of gravity and ordinarily through the axis of the crank shaft of the engine. The pitch and yaw impulses in these sandwich mountings are also accommodated in shear as these movements tend to swing around the focal point 5. The angle between the line through the center of the mountings and line $x$—$x$ may be of such a degree that the resistance to torque movement about the axis $x$—$x$ and the resistance to pitch and yaw will be substantially equal. This depends somewhat on the relative distance between the mounting and the axis $x$—$x$ and the distance from the focal point to the mounting. In very many installations this relation does not give the result most desired because it is preferable, under many circumstances, to provide a resistance to pitch and yaw less than that interposed against torque impulses. Such a variation is accomplished in the patent to Browne and Taylor No. 2,175,825 and in my former application, Serial No. 354,595, filed Aug. 28, 1940. In the Browne and Taylor patent and in my former application this variation is accomplished through a local swinging action of the resilient elements. In the present structure the yielding in the resilient element, under all conditions, is around the focal center in a direction substantially tangent to the sphere, the pivotal connections between the resilient member and the engine and the ring permitting the mounting as a whole to swing freely in a pitch and yaw direction at right angles to the direction of the axes of such connection so that as to these directions the pitch and yaw resistance is zero whereas the mountings having their axes in the pitch and yaw direction have the full resilient resistance. Therefore, assuming that the radial placing of the mountings would make the pitch and yaw and torque resistances equal the pitch and yaw resistance would be approximately half of that of the torque resistance because only half as many mountings would be resisting the pitch and yaw movements as resist the torque impulses.

It will be noted that the line of strain, that is, the pull on the upper mountings and compression on the lower mountings from the weight of the engine is sustained by rubber in compression. Thus the engine is held with a desirable stability, the cushioning being accomplished as desired by a proportioning of the rubber elements. The utilization of the swinging action of the mountings tangent to the sphere about the focal point makes it possible to bring the resilient member to the least possible dimension and is in this respect advantageous. This also improves the translational resistance of the mounting assembly.

Inasmuch as part of the rubber element through which the arms 12 extend are thus reduced in area it is preferable to compensate in the companion element by some means as by changing the diameter of the discs or by making both elements alike.

What I claim as new is:

1. A yielding mounting comprising members having opposing substantially plane faces, and resilient material between the faces yielding to permit a shear movement of the members in different edgewise directions of the faces, and an auxiliary joint means on said mounting providing for local swinging of the faces in one shear direction to provide differential resistance of the mounting in two shear directions.

2. A mounting assembly, a vibrating body and a mounting means attached thereto for supporting the body including a group of units, each unit comprising members having opposing faces with resilient material between the faces yielding to permit a shear movement of the members in different directions of the faces, the faces of the members of the units being arranged at substantially right angles to lines extending from the faces to a common focal point, a member of each unit being connected to the body to swing in one shear direction about the focal point, the resilient material permitting the said swinging movement through shear of the material, and auxiliary joint means on said mountings permitting local swinging of the faces in another shear direction to provide differential resistance of the mounting in two shear directions.

3. In a mounting assembly, a vibrating body having induced torsional vibrations and vibrations transverse to the torsional vibration, a mounting means attached thereto for supporting the body including a group of units, each unit comprising members having opposing faces with resilient material between the faces the material of the units yielding to permit a shear movement of the members in different shear directions of the faces in response to torsional vibrations and vibrations of the body transverse to the torsional vibrations about a common focal point, and an auxiliary joint means on each of said mountings permitting local swinging of the faces in another shear direction to provide differential resistance of the group to torsional impulses and impulses transverse to the torsional impulses.

4. In a mounting assembly, a vibrating body having induced torsional vibrations and vibrations transverse to the torsional vibration, a mounting means attached thereto for supporting the body including a group of units, each unit comprising members having opposing faces with resilient material between the faces yielding to permit a shear movement of the members, the faces of the members of the group being at right angles to focal lines leading to a common focal point, a member of each unit being connected to the body to swing in one shear direction about the focal point and permitting a shear movement of the members about said focal point in response to torsional vibrations and vibrations of the body transverse to the torsional vibrations, and an auxiliary joint means on each mounting permitting local swinging of the faces in one shear direction to provide differential resistance of the mounting in two shear directions.

5. In a mounting assembly, a vibrating body having induced torsional vibrations and vibrations transverse to the torsional vibration, a mounting means attached thereto for supporting the body including a group of units, each unit comprising members having opposing faces with resilient material between the faces yielding to permit a shear movement of the members, the faces of the members of the group being at right angles to focal lines leading to a common focal point and permitting a shear movement of the members about said focal point in response to torsional vibrations and vibrations of the body transverse to the torsional vibrations, and an auxiliary joint means on each unit comprising two joints for each unit, each joint swinging about a single axis at right angles to a line leading from the face to the focal point, the axes of different joints being out of parallel, said auxiliary joints reducing the shear resistance in one shear direction over that of another.

6. In a mounting assembly, a vibrating body having induced torsional vibrations and vibrations transverse to the torsional vibration, a mounting means attached thereto for supporting the body including a plurality of units grouped about the axis of the vibrating body, each unit comprising members having opposing faces with resilient material between the faces yielding to permit a shear movement of the members in response to torsional vibrations and vibrations transverse to torsional vibrations of the body, the units having their faces at substantially right angles to a line extending from the faces to a common focal point along the axis of the vibrating body, one member of each unit being connected to the body to swing in one shear direction about the focal point, and auxiliary joint means on each unit permitting local swinging of the faces in a shear direction providing differential resistance of the mountings to torque movements and vibratory movements transverse to the torsional vibrations.

7. A yielding mounting assembly comprising a plurality of units grouped about a common axis having opposing substantially plane faces, and resilient material between the faces yielding to permit a shear movement of the members in different edgewise directions of the faces, and auxiliary joint means for each unit comprising joints at opposite sides of the member, each joint swinging about a single axis parallel to the faces and at right angles to a radial line extending to the axis.

HUGH C. LORD.